United States Patent [19]

Ishikawa

[11] Patent Number: 4,673,319
[45] Date of Patent: Jun. 16, 1987

[54] MAJOR-MINOR TOOL SHANK FOR MACHINE TOOL

[75] Inventor: Kazutomi Ishikawa, Okayama, Japan

[73] Assignee: Mori Machinery Co., Ltd., Okayama, Japan

[21] Appl. No.: 828,498

[22] Filed: Feb. 11, 1986

[30] Foreign Application Priority Data

Feb. 16, 1985 [JP] Japan .................................. 60-28594

[51] Int. Cl.⁴ ............................................... B23C 9/00
[52] U.S. Cl. ................................... 409/234; 279/1 A
[58] Field of Search ............... 409/231, 232, 233, 234; 408/239 R, 238; 279/1 A, 102, 103

[56] References Cited

U.S. PATENT DOCUMENTS

| | | | |
|---|---|---|---|
| 4,204,304 | 5/1980 | Eldam | 409/232 |
| 4,238,167 | 12/1980 | Brugger et al. | 409/232 |
| 4,274,774 | 6/1981 | Haga et al. | 409/232 |
| 4,563,116 | 1/1986 | Edens | 409/234 X |

FOREIGN PATENT DOCUMENTS

| | | | |
|---|---|---|---|
| 2227309 | 3/1973 | Fed. Rep. of Germany | 409/234 |
| 159003 | 5/1957 | Sweden | 409/231 |

OTHER PUBLICATIONS

Documents—Brochure for System Small Tool.

*Primary Examiner*—William R. Briggs
*Attorney, Agent, or Firm*—Koda and Androlia

[57] ABSTRACT

A major-minor tool shank for a machine tool including a major tool shank for fitting a minor stool shank therein. One end of the major tool shank is a minor taper pot provided with a lock mechanism for locking the minor tool shank, the lock mechanism including lock pins installed in holes opening through the wall of the minor taper pot. A cylindrical tool grip and a sleeve cap cover the minor taper pot, and a coil spring is provided between the tool grip and the sleeve cap. With the aid of spring force, the inner end of the lock sleeve pushes the lock pins in the radial direction and the pins latch the pull stud of the minor tool shank to connect and hold the minor tool shank in the major tool shank. When the lock sleeve is pushed in the axial direction, overcoming the spring force, the lock pins are released from the pull stud of the minor tool shank. Thus, the minor tool shank can snap off the major tool shank.

4 Claims, 6 Drawing Figures

MAJOR-MINOR TOOL SHANK FOR MACHINE TOOL

BACKGROUND OF THE INVENTION

1. Field of the Invention

The present invention relates to a major-minor (or parent-child) tool shank, and more particularly to a major-minor tool shank wherein the size of the automatic tool changer (hereinafter called ATC), which is installed in an automatic machine tooling center (hereinafter called MC), is reduced.

2. Prior Art

Currently, an MC requires a large number of tools in order to reduce manpower through systematization and to carry out combined production of products. Along with the increasing number of tools required, the cost related to such tools has also increased. While the tools, such as drills, taps, small mills, are small in size, the are combined into an integral unit with large tool holders having pull studs of specific dimensions.

In an attempt to streamline the foregoing product, a product which is exchangeable with small size tool holders has been developed so that conventional size tool holders can be exchanged therewith. This product is now in parctical use in some places. In this case, the conventional tool holder is called the parent (major) tool shank, and the small tool holder which is to be fitted into the parent shank is called the child (minor) shank.

However, the child taper (tapered) pot of conventional parent tool shanks has not been provided with a lock mechanism to prevent the minor tool shank from slipping off. Therefore, this type of tool shank is defective safety-wise when performing transfers during high speed exchanges.

Furthermore, the pull-studless tool holder has a specific structure that can be used only for the parent-child tool shank, and is not a generalized tool holder. Thus, there have been no major-minor tool shanks constructed combining a large size major tool shank with the foregoing pull-studless tool holder such as a minor tool shank.

SUMMARY OF THE INVENTION

In light of the above mentioned defects in conventional tool holders, the object of the present invention is to provide a major-minor tool shank for a machine tool that has a simple structure and a complete locking mechanism provided on it.

Another object of the present invention is to provide a major-minor tool shank for a machine tool that is safe and free of trouble during tool exchange operation.

Still another object of the present invention is to provide a major-minor tool shank for a machine tool wherein it is easy to carry out cleaning of the minor taper pot as well as the minor tool shank.

To achieve the objects of the present invention, the major-minor tool shank of the present invention includes major and minor tool shanks both of which are provided with a pull stud. This major-minor tool shank has a new structure wherein the minor tool shank is inserted and locked into the major tool shank. Since this structure is simple it can also be used for a tool shanks which do not have a pull-stud and are clamped down by a grooved portion located midway along the tapered portion.

The first characteristic feature of this major-minor tool shank for a machine tool is the following construction provided with a complete locking mechanism that works during transfer movement. That is, a minor (child) taper pot whereto a minor (child) tool shank is to be inserted is provided in the tool grip portion of a major tool shank having a tapered portion that matches the tapered portion of the spindle. At the bottom portion of the minor taper pot, lock pin holes and lock pins are formed. Also, along the outer circumference of the minor taper pot, a lock sleeve that moves in the axial direction is held elastically with springs.

In the structure mentioned above, the inner end of the lock sleeve serves as a cam face for the lock pin, and along the outer circumference of the lock sleeve, a sleeve cap with springs for moving the sleeve in the axial direction installed in it is provided in order to facilitate the movement of the lock sleeve.

The second characteristic feature of the major-minor tool shank for a machine tool of this invention is found in the construction arranged to completely eliminate trouble that may be caused during the exchange of tools. That is, the inner end of the lock sleeve mentioned above is formed into the cam face followed by an escape groove for the foregoing lock pin. A release hammer that is to press the bottom surface of the tapered portion of the minor tool shank by utilizing the above mentioned escape groove is provided by cutting through the taper pot wall of the minor tool shank. In addition, at the bottom portion of the taper pot, a self-holding pin for a minor pull stud is disposed in the form of protruding by a flat spring that presses the self-holding pin toward the inside of the taper pot.

Furthermore, the third characteristic feature of the major-minor tool shank for a machine tool is that the structure facilitates cleaning of the minor taper pot and minor tool shank. That is, the major tool shank is provided with an air blow hole along its axis, one end of the hole opening at the end of the pull stud and the other end at the bottom surface of the minor taper pot. An air adjusting valve is provided in the air blow hole.

In the major-minor tool shank for machine tool provided by the present invention, as the lock mechanism for retaining the minor tool shank in the major tool shank, the cam face at the end of the lock sleeve and the springs which function as the return spring are utilized. Therefore, complete locking can be effected by only inserting the minor tool shank after the lock pin is released by pressing the sleeve cap of the major tool shank, and then by releasing the pressing force of the sleeve cap. Also, apart from the lock pin, the self-holding pin that is held elastically by the flat spring is provided in order to prevent the minor tool shank from slipping off due to tare weight during the transfer. At the same time, by means of the release hammer that operates by movement of the lock sleeve, the tight fit between the tapered surfaces during operation can be loosened.

Furthermore, at the time of the exchange of the minor tools, air can be jetted into the minor tool pot through the air blow hole. As a result, air-cleaning of the tapered surface of the minor tool shank and the minor tool pot is facilitated. In addition, when releasing the minor tool shank, the above mentioned sleeve cap is automatically pressed down only by means of a release dog provided in the minor tool exchange arm. Consequently, it is unnecessary to separately provide an actuator driven by air or hydraulic pressure. The structure

DETAILED DESCRIPTION OF THE INVENTION

Figure 1:
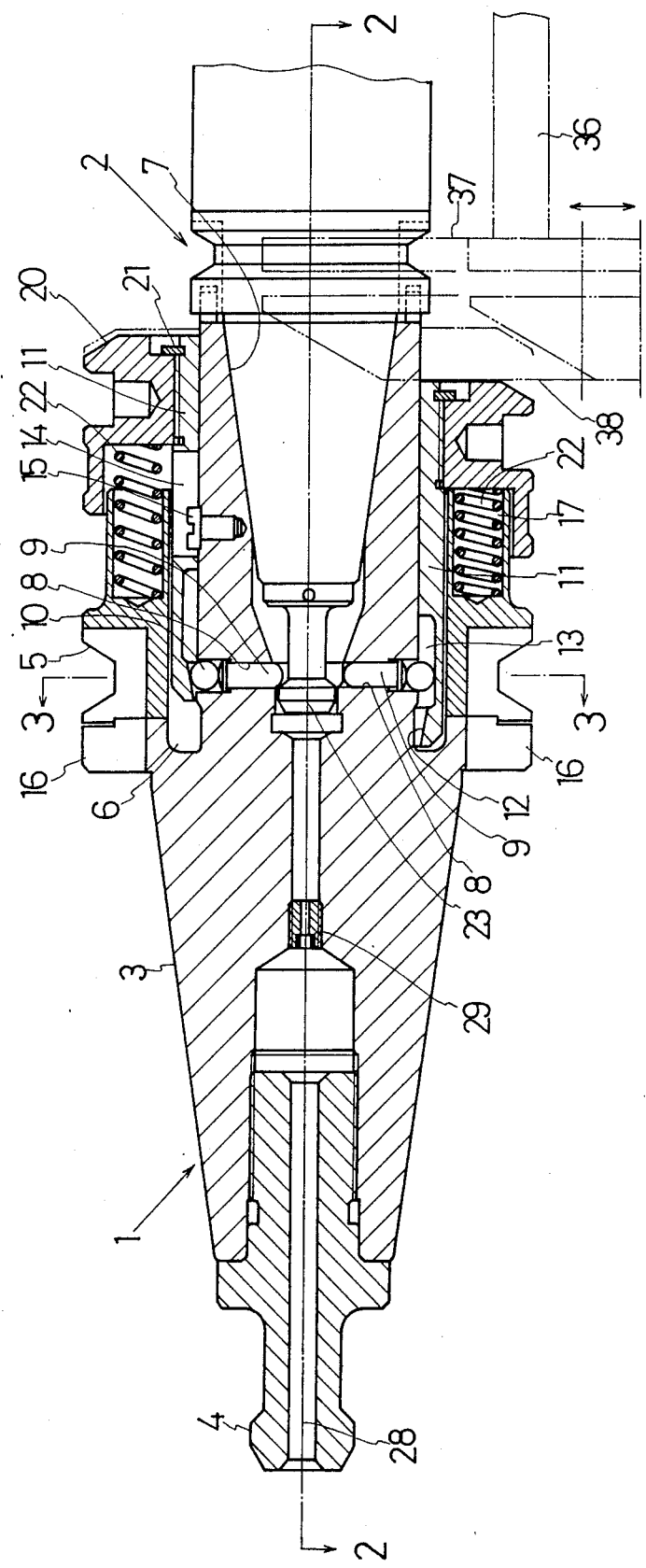
FIG. 1 is a sectional view of a major-minor tool shank in accordance with the present invention taken along the line 1—1 in FIG. 3, the upper half showing the locked state and the lower half showing the released state.

Hereunder, a detailed description of the major-minor tool shank for machine tool according to the present invention will be given with referecne to the drawings.

A major tool shank 1 is used with a minor tool shank 2 inserted in it. This major tool shank 1 includes a tapered body 3, a pull stud 4, and a tool grip 5. The tapered body 3 is to be inserted in the tool pot of the ATC or the spindle, and the tapered portion of this taper body is formed to fit the tapered portion of the spindle. The pull stud 4 is formed at the front end of the taper body 3, and the tool grip 5 is provided at the base of the taper body 3. Inside of the tool grip 5, a deep spot facing hole 6 is formed, and furthermore, inside of the hole 6 a minor taper pot 7 is provided. A minor tool shank 2 is to be inserted into this taper pot 7.

As shown in FIG. 1, from the spot facing hole 6, in the direction of the minor taper pot 7, lock pins 8 are provided at two locations along the diameter of the taper pot 7. Lock pins 9 and lock balls 10 are inserted in the series into the lock pin holes 8. In this case, the lock pin hole 8 is formed in the stepped hole in order to prevent the entire lock pin 9 from entering the minor taper pot 7. Also, friction against the cam face is decreased by means of the lock ball 10.

Into the spot facing hole 6, a lock sleeve 11 is inserted in a slidable manner. The inner circumferential edge at the end of the lock sleeve 11 serves as a cam face 12 that gets wider in a tapered form as it goes toward the inside. Contiguously to the cam face 12, an escape groove 13 for the lock ball 10 and a whirl stop slit 14 as a part of the sleeve is disposed. Corresponding to the whirl stop slit 14, a whirl stop machine screw 15 is screwed into the minor taper pot 7.

For convenient assembly, the spot facing hole 6 of the lock sleeve 11 is formed in the following manner: The tool grip and an outer ring 19 are mounted to a flange 16 at the base portion of the major tool shank 1. This outer ring 19 is located next to the tool grip 5, and it has six spring receiving holes 17 (see FIG. 1) and six assembly machine screw holes 18 (see FIGS. 2 and 4). Thus, the spot facing hole 6 of the lock sleeve 11 is formed with the inside surfaces of the flange 16, the tool grip 5, the outer ring 19, and the outer circumfererntial surface of the minor taper pot 7. Onto the upper edge of the lock sleeve 11 that slides within the spot facing hole 6, a sleeve cap 20 is screwed in and fixed by a retaining ring 21. The sleeve cap 20 serves to press and cover the above mentioned spring receiving holes 17.

In such a structure, as is seen in the upper half of FIG. 1, when the minor tool shank 2 is not in the minor taper pot 7, the sleeve cap 20 is positioned at the location indicated by two-dot chain lines in the Figure by the spring 22. In this state, when the sleeve cap 20 is pressed toward the left side in the Figure, either manually or mechanically, in order to press the lock sleeve 11 into the spot facing hole 6 and to bring it to the position shown in the lower half of the Figure, then, after inserting the minor tool shank 2 by pressing it, the pressing force is removed and the lock sleeve 11 returns to the position shown in the upper half of the Figure due to the repellent force of the spring 22. As a result, the cam face 12 presses the lock pin 9 and the lock ball 10 so they protrude to the neck portion of the minor pull stud 23 of the minor tool shank 2. Thus, the lock pin 9 and the lock ball 10 are locked. In this state, the minor tool shank is no longer allowed to come off.

In order to press the sleeve cap mechanically the exchange arm having the release dog for releasing clamping on the minor tool shank 2 is used. One example of such an exchange arm is shown by the two-dot chain lines in the lower right portion of FIG. 1. In this exchange arm 36, parallel with the grip pallet 37 of the exchange arm 36, a release dog 38 having a sloped surface from its end is provided. When using this exchange arm, at the time the grip groove of the minor tool shank 2 is gripped, simultaneously, the sleeve cap 20 is pressed by the release dog 38. As a result, the lock is released.

In the major-minor tool shank provided by the present invention, in addition to the positive lock mechanism mentioned above, another arrangement is incorporated in the structure so as to prevent the minor tool shank 2 from falling by the tare weight when it is released. As shown in the upper half in FIG. 2 as well as in the right half of FIG. 4, from the cutout portion at the outer circumference of the minor taper pot 7, a self-holding pin 24 is pressed lightly by a flat spring 25. In this way the neck portion of the minor pull stud 23 is lightly supported. Because this self-holding pin 24 sticks out only by the pressing force of the flat spring 25, it has only slight resistance against the movement of the minor tool shank during insertion and detachment of it.

Figure 2:
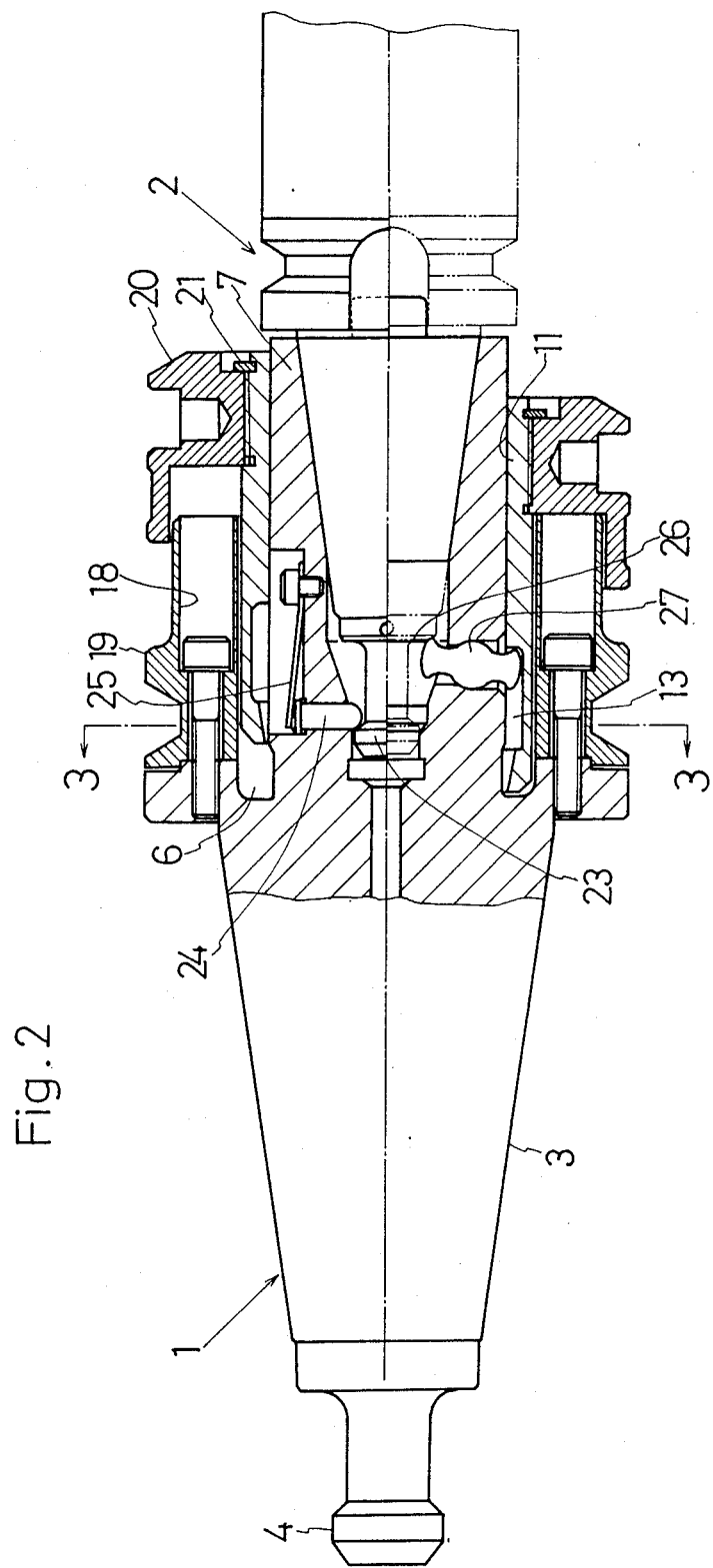
FIG. 2 is a sectional view of the major-minor tool shank taken along the line 2—2 in FIGS. 1 and 3, the upper half showing the locked state, while the lower half shows the released state.
Figure 3:
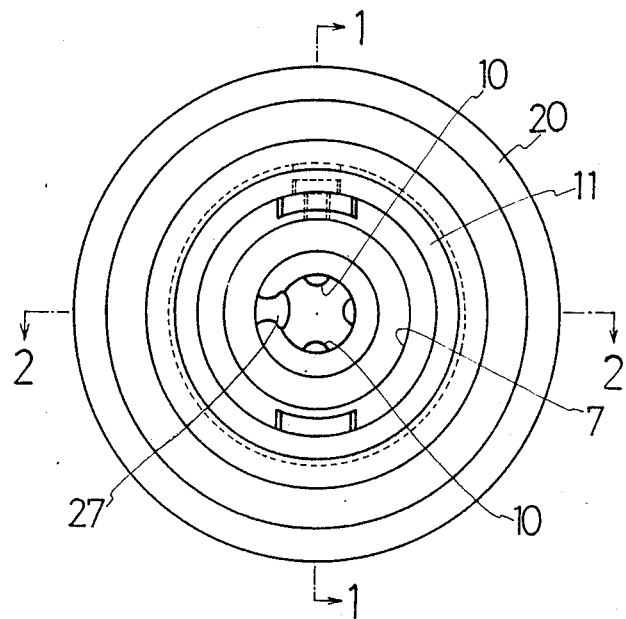
FIG. 3 is a front view of major-minor took shank.
Figure 4:
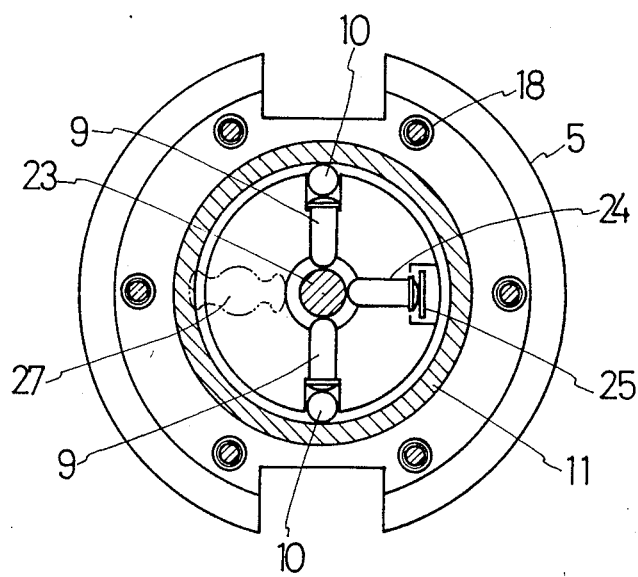
FIG. 4 is a sectional view thereof taken along the line 3—3 in FIGS. 1 and 2.

For releasing the tight fit of the tapered surface of the minor tool shank, as seen in the lower half in FIG. 2 as well as in the left half in FIG. 4, the side portion of the minor taper pot 7 is cut through from the side surface to the space for the travel stroke in the escape groove 13 for the lock ball (the groove for letting off the lock ball), that is formed in the lock sleeve 11. By using this cutout space, a release hammer 27 is disposed so that it strikes the bottom surface 26 of the tapered portion of the minor tool shank 2.

This release hammer is formed so as to have a ball shape at its center with protruding portions disposed on both sides of the ball shape center portion. At the position shown in the Figures, the inner side of the release hammer 27 is in contact with the bottom surface 26 of the tapered portion of the minor tool shank 2, which the outer side of the release hammer 27 is in contact with the side opposite to the cam face 12 of the escape groove 13 of the lock sleeve 11. Consequently, when the sleeve cap 20 is pressed in, as shown in the lower half in FIG. 2, the release hammer 27 strikes the minor tool shank 2 in the direction to release. As a result, the tight fit of the tapered portion is loosened and released.

Also, in the major tool shank 1, an air blow hole 28 and an air adjusting valve 29 are provided. The air blow hole 28 extends from the end of the pull stud 4 to the bottom surface of the minor taper pot. The air adjusting valve 29 is disposed in the air blow hole 28 midway between the end of the pull stud 4 and the bottom surface of the minor taper pot 7. This air adjusting valve 29 functions to regulate the air quantity. The foregoing air blow hole 28 and air adjusting valve 29 form a cleaning unit to clean the minor tool pot 7 as well as the tapered surface of the minor tool shank 2.

With regard to the lock mechanism, the mechanism for preventing the minor tool shank from falling by tare weight, the mechanism for releasing the tight fit of the tapered portion, and the air cleaning unit of the major tool shank according to the present invention, it is readily conceivable that the foregoing mechanisms and unit perform the same functions as those provided corresponding to the minor tool shank having the pull stud, if these mechanisms and unit are provided corresponding to the outer circumferential groove formed at the middle of the tapered portion. Furthermore, it is also possible to use the major tool shank as the spindle of the MC.

A major-minor tool shank having the structure described above can be applied to any tapered form products which are generally in use. Besides, it can be used in exactly the same manner as a conventional tool shank. In addition, while this major-minor tool shank can be used for a conventional tool magazine, the tool magazine itself can also be improved to fit the major-minor tool shank, so that a tool magazine capable of storing a large number of tools in spite of its small size can be obtained.

Figure 5:
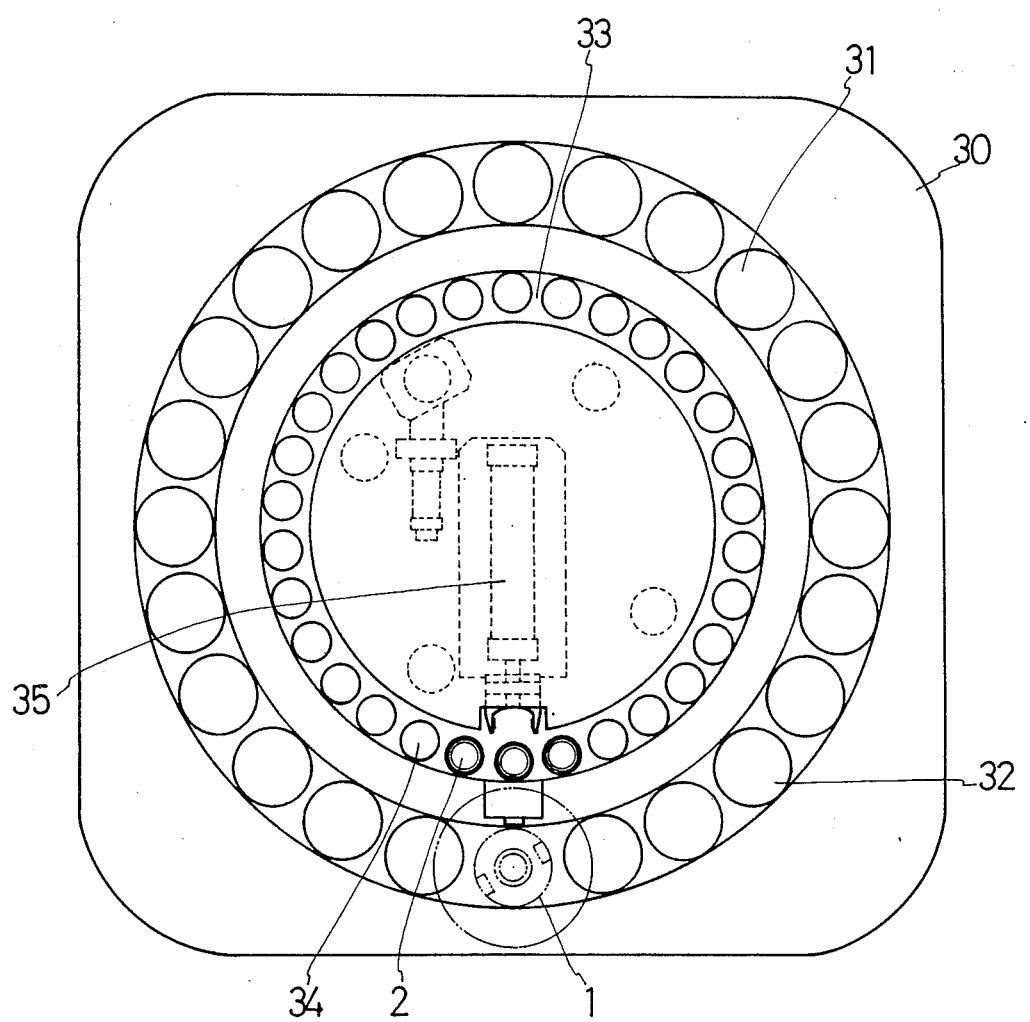
FIG. 5 is a front view of ATC for major-minor tool shank.
Figure 6:
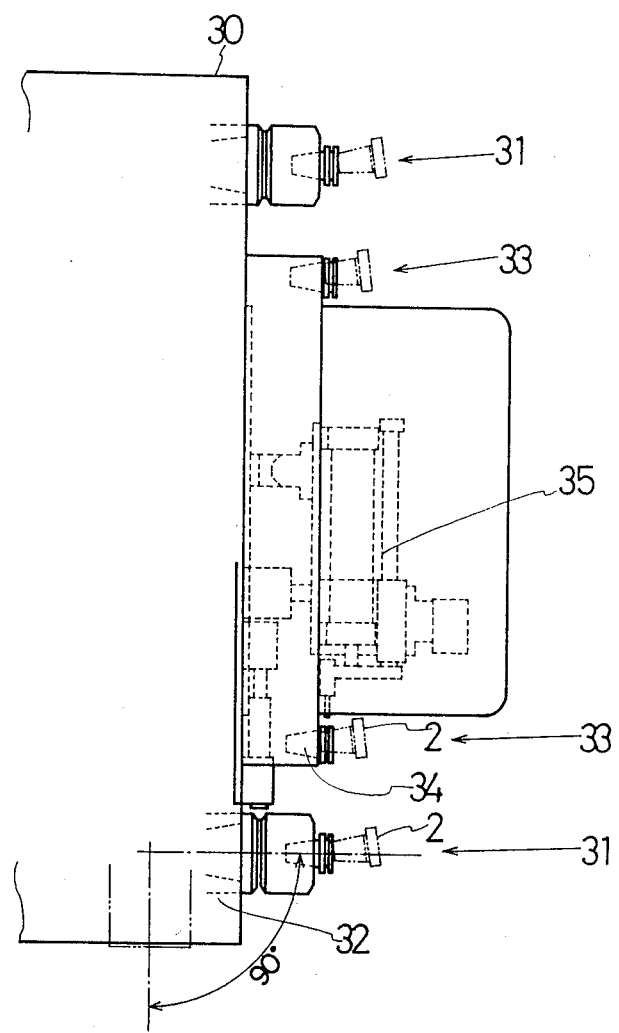
FIG. 6 is a side view thereof.

For example, FIGS. 5 and 6 show a major-minor tool exchanger installed in an overturned drum form ATC. In this case, the major tool shank 1 of the present invention is inserted in a part of respective major tool pots 32 of a conventional multitude main magazine 21 provided in a circular form along the surface of the drum 30. Also, the minor tool magazine 33 is provided concentrically at the position inside the main magazine 31 where conventionally nothing was provided. Then, into each minor tool pot 34 of the minor tool magazine 33, the minor tool shank 2 is inserted. Furthermore, inside of the above mentioned minor tool magazine 33, a child exchanger 35 is installed. This minor tool shank exchanger 35 functions to insert and detach the minor tool shank 2 into and from the major tool shank 1. In this way the space of the drum can be used effectively and a tool magazine capable of store a lot of tools, as previously mentioned, can be formed. In this type of magazine, small size tools such as drills, center drills, taps, end mills, spot facing tools, can be stored in the minor tool shanks. As a result, the exchanger also contributes to reducing costs.

Moreover, this exchanger has more advantages in that tools do not slip off during high speed transfer as well as during exchanges performed in the tool magazine and thus, operation thereof is much safer.

I claim:

1. A major-minor tool shank for a machine tool comprising:
   a major tool shank having a tapered portion which matches the tapered portion of a spindle, said major shank also having a tool grip portion;
   a minor taper pot whereto a minor tool shank is to be inserted;
   lock pin holes and lock pins provided at the bottom portion of the minor taper pot; and
   a lock sleeve movable in the axial to actuate said lock pins, said sleeve being held elastically by means along the outer circumference of the minor taper pot.

2. A major-minor tool shank for a machine tool according to claim 1, wherein the inner end of said lock sleeve is formed into a cam face for the lock pin, and a sleeve cap which includes springs serving to move the lock sleeve in the axial direction is provided on the outer circumference of said lock sleeve.

3. A major-minor tool shank for a machine tool according to claim 1, wherein:
   the inner end of the lock sleeve is formed into a cam face, and an escape groove for the lock pin is continuously formed next to said cam face;
   a release hammer for pressing the bottom surface of the tapered portion of the minor tool shank is provided through the minor taper pot wall; and
   a self-holding pin for holding the minor pull stud is pressed by a pressing spring such that said self-holding pin sticks out to the bottom portion of the minor taper pot.

4. A major-minor tool shank for a machine tool according to claim 1, wherein the major tool shank is provided with an air blow hole extending from the end of the pull stud of the major tool shank to the bottom surface of the minor taper pot, said major tool shank further being provided with an air adjusting valve.

* * * * *